United States Patent
Bawri et al.

(10) Patent No.: US 11,535,559 B2
(45) Date of Patent: Dec. 27, 2022

(54) ENGINEERED CONCRETE BINDER COMPOSITION COMPRISING MECHANO-CHEMICALLY MODIFIED COMPONENT AND METHOD OF PRODUCING THE SAME

(71) Applicant: SAROD GREENBACK LLP, Kolkata (IN)

(72) Inventors: Binod Kumar Bawri, Kolkata (IN); Saroj Bawri, Kolkata (IN); Malvika Bawri, Kolkata (IN); Raghunandan Kadaba, Kolkata (IN)

(73) Assignee: SAROD GREENBACK LLP, Kolkata (IN)

( * ) Notice: Subject to any disclaimer, the term of this patent is extended or adjusted under 35 U.S.C. 154(b) by 0 days.

(21) Appl. No.: 17/252,559

(22) PCT Filed: Aug. 30, 2018

(86) PCT No.: PCT/IB2018/056628
§ 371 (c)(1),
(2) Date: Dec. 15, 2020

(87) PCT Pub. No.: WO2019/239203
PCT Pub. Date: Dec. 19, 2019

(65) Prior Publication Data
US 2021/0323869 A1     Oct. 21, 2021

(30) Foreign Application Priority Data
Jun. 15, 2018  (IN) .............................. 201831022452

(51) Int. Cl.
| | | |
|---|---|---|
| *C04B 28/18* | (2006.01) | |
| *C04B 22/06* | (2006.01) | |
| *C04B 22/14* | (2006.01) | |
| *C04B 28/02* | (2006.01) | |
| *C04B 103/00* | (2006.01) | |
| *C04B 103/10* | (2006.01) | |
| *C04B 111/00* | (2006.01) | |

(52) U.S. Cl.
CPC ............ *C04B 28/18* (2013.01); *C04B 22/064* (2013.01); *C04B 22/147* (2013.01); *C04B 28/021* (2013.01); *C04B 2103/0088* (2013.01); *C04B 2103/10* (2013.01); *C04B 2111/00327* (2013.01)

(58) Field of Classification Search
CPC ....... C04B 7/02; C04B 14/026; C04B 14/106; C04B 14/16; C04B 14/18; C04B 18/08; C04B 18/14; C04B 18/141; C04B 18/146; C04B 20/0076; C04B 22/062; C04B 22/064; C04B 22/147; C04B 28/02; C04B 28/04; C04B 28/06; C04B 28/18; C04B 28/021; C04B 2103/10; C04B 2103/0088; C04B 2111/00327; C09K 8/46; Y02W 30/91
See application file for complete search history.

(56) References Cited

U.S. PATENT DOCUMENTS

| | | | | |
|---|---|---|---|---|
| 7,972,432 | B2 * | 7/2011 | Guynn | .................... C04B 28/02 106/713 |
| 8,551,245 | B2 * | 10/2013 | Guynn | .................... B02C 21/00 106/713 |
| 9,067,824 | B1 * | 6/2015 | Hansen | ............... C04B 40/0039 |

FOREIGN PATENT DOCUMENTS

WO      WO-0050362 A1 *   8/2000   ........... C04B 14/106

\* cited by examiner

*Primary Examiner* — Anthony J Green

(57) ABSTRACT

The present invention relates to a compact and highly dense engineered concrete binder composition and a method of producing the same. In particular, the engineered concrete binder composition comprises at least one mechano-chemically modified component.

20 Claims, No Drawings

ENGINEERED CONCRETE BINDER COMPOSITION COMPRISING MECHANO-CHEMICALLY MODIFIED COMPONENT AND METHOD OF PRODUCING THE SAME

FIELD OF THE INVENTION

The present invention relates to a compact and highly dense engineered concrete binder composition and a method of producing the same. In particular, the engineered concrete binder composition comprises at least one mechano-chemically modified component.

BACKGROUND OF INVENTION

Concrete is among the most commonly and profusely used construction materials worldwide.

It is primarily a composite comprising coarse and fine aggregate with cement. Water is then added to obtain a slurry and this concrete slurry is used for different construction purposes.

The uses of concrete include, but are not limited to laying roads and pavements, construction of buildings, skyscrapers, dams, multi-story car parks and many others.

The use of concrete, however, is an environmentally unfriendly process as the production of cement is a major contributor to greenhouse gas emissions. Therefore several other components are now used as a replacement for cement, and efforts are being made to obtain more eco-friendly concrete mixes, without compromising the properties of concrete.

Among the compounds used as a replacement for cement include pozzolanic materials. Pozzolans include a broad class of compounds that are siliceous or aluminous in nature. A few examples of pozzolanic materials include fly ash, silica fumes, granulated blast furnace slag, and metakaolin among others. While these materials do not contribute any properties to the concrete in themselves when pozzolanic materials are very finely ground they are able to react with the concrete components (calcium hydroxide and water) and enhance the cementitious properties.

The properties of concrete that are most desired include durability, which is the ability of concrete to resist deterioration caused overtime, workability which is ease of handling, setting and finishing, and strength which is the ability to bear high pressure and weight. The strength of concrete is a very important property in determining its use. For example, concrete compressive strength requirements can vary from 2500 psi (17 MPa) for residential concrete to 4000 psi (28 MPa) and higher in commercial structures. Higher strengths up to and exceeding 10,000 psi (70 MPa) are specified for certain applications.

The strength property of concrete develops as the concrete hardens over a few days after it has been set. During the phase the strength of the concrete develops, it is not available to use freely as the concrete is not able the bear the full pressure requirements required by it. This poses a problem as construction work is slowed down and the use of the construction is delayed.

U.S. Pat. No. 4,350,533 provides a hydratable cement powder which during the early stages of hydration produces an amount of ettringite equal to from about 40% to about 60% of the weight of the cement/water paste, said powder comprising, by weight, from about 18% to about 65% high alumina cement, from about 16% to about 35% calcium sulfate, from 0% to about 65% portland cement, and from 0% to about 8.5% extraneous lime, said portland cement and said extraneous lime being alternative or complementary sources of from about 3.5% to about 8.5% of calcium oxide during hydration of the cement powder.

U.S. Pat. No. 5,352,288 provides a concrete composition comprising a calcium oxide material, a pozzolanic material, and an alkali metal catalyst to obtain a low cost, high compressive strength cement mix.

U.S. Pat. No. 4,957,556 provides methods for forming very early setting, ultra high strength cement. The methods comprise forming a mixture of raw materials containing $SiO_2$, $Al_2O_3$, $CaO$, $Fe_2O_3$, and $SO_3$. This mixture is heated to an elevated temperature between 1,0000° C. and 1,2000° C. for a sufficient period of time to produce a clinker containing high concentrations of $C_4A_3S$.

In an effort to obtain early setting and early high strength concrete mixes, the Applicant previously proposed in Indian Patent No. 292690 a concrete binder composition having overall reduced clinker factor, wherein the said concrete binder composition comprises: at least one primary binder in a ratio of 10-60 weight percent, wherein the primary binder is selected from a primary material group having spontaneous hydration property; at least one secondary binder in a ratio of 40-90 weight percent, wherein the secondary binder is selected from a secondary material group having induced hydration property; wherein the said primary material group and the said secondary material group form a Macro-Micro-Nano particle lattice arrangement to increase the strength characteristics and durability index of the final concrete material. Entire contents of Indian Patent No. 292690 are incorporated herein.

The Applicant furthermore proposed in Indian Patent Application No. 201731027025 an engineered concrete binder composition comprising at least one hydraulic material; at least one pozzolanic material; and optionally at least one additive; an amount of the hydraulic material (W1) being in a range of 20 to 60 wt. % of the composition; an amount of the pozzolanic material (W2) being in a range of 40 to 90 wt. % of the composition; and an amount of the at least one additive (W3) being in a range of 0 to 15 wt. % of the composition; each of the hydraulic material and the pozzolanic material comprising a first fraction, a second fraction and a third fraction with: the first fraction having Blaine's fineness in a range of 3000 to 4000 $cm^2$/gm and mode average particle size (MAPS) in a range of 70 to 80 microns; the second fraction having Blaine's fineness in a range of 10000 to 15000 $cm^2$/gm and mode average particle size (MAPS) in a range of 20 to 30 microns; and the third fraction having Blaine's fineness in a range of 40000 to 50000 $cm^2$/gm and mode average particle size (MAPS) in a range of 3 to 8 microns. Entire contents of Indian Patent Application No. 201731027025 are incorporated herein.

While efforts have been made to obtain early setting, high early strength concrete mixes these have fallen short as they often involve additional steps for manufacture and addition of several other components. This makes these compositions expensive and difficult to use especially in cases where dry packaged concrete is required. Thus there is a need to obtain a simplified early setting, high early strength concrete mix which is amenable for use and inexpensive.

SUMMARY OF INVENTION

In view of the aforesaid needs and shortcomings in the state of the art, in an aspect, the present invention provides a composition and a process of preparing a compact and highly dense construction material that has high early strength properties.

In accordance with an aspect of the present invention, there is provided an engineered concrete binder composition, comprising: a first set of cementitious material comprising hydraulic material optionally along with pozzolanic material; and a second set of cementitious material comprising pozzolanic material and pozzolan activator material, the second set of cementitious material having a mode average particle diameter (D2) not greater than ⅓ of the mode average particle diameter of the first set of cementitious material (D1).

Further, in accordance with an aspect of the present invention, the engineered concrete binder composition comprises the first set of cementitious material having Blaine's fineness in a range of 3000 to 4000 $cm^2/gm$ and mode average particle size (MAPS) in a range of 70 to 80 microns, and the second set of cementitious material have Blaine's fineness in a range of 10000 to 15000 $cm^2/gm$ and mode average particle size (MAPS) in a range of 20 to 30 microns.

In accordance with an aspect of the present invention, the engineered concrete binder composition comprises the second set of cementitious material comprises 70 to 97 wt. % of pozzolanic material and 3 to 30 wt. % of pozzolan activator material.

Additionally, also provided in an aspect of the present invention is a process for preparing an engineered concrete binder composition, said process comprising: mixing a first amount of a first set of cementitious material with a second amount of a second set of cementitious material to obtain the engineered concrete binder composition, wherein, the first set of cementitious material comprises hydraulic material optionally along with pozzolanic material; and the second set of cementitious material comprises pozzolanic material and pozzolan activator material, the second set of cementitious material having a mode average particle diameter (D2) not greater than ⅓ of the mode average particle diameter of the first set of cementitious material (D1).

The present engineered concrete binder composition and the process of preparation thereof, satisfies all the mechanical properties, chemical properties, setting time property, early strength property as well as the production cost as required in the various concrete industry standards. The present invention, therefore, provides improved strength and setting properties at the same time provides maximum utilization of pozzolanic materials instead of ordinary Portland cement in the concrete industry.

This together with the other aspects of the present invention along with the various features of novelty that characterized the present disclosure is pointed out with particularity in claims annexed hereto and forms a part of the present invention. For a better understanding of the present disclosure, its operating advantages, and the specified objective attained by its uses, reference should be made to the accompanying descriptive matter in which there is illustrated exemplary embodiment of the present invention.

DETAILED DESCRIPTION

The exemplary embodiment described herein detail for illustrative purposes are subjected to many variations. It should be emphasized, however, that the present invention is not limited to the method of producing the compact and highly dense construction material(s). It is understood that various omissions and substitutions of equivalents are contemplated as circumstances may suggest or render expedient, but these are intended to cover the application or implementation without departing from the spirit or scope of the present invention.

Unless otherwise specified, the terms, which are used in the specification and claims, have the meanings commonly used in the field of infrastructure construction and cement/concrete industry. Specifically, the following terms have the meanings indicated below.

The terms "a" and "an" herein do not denote a limitation of quantity, but rather denote the presence of at least one of the referenced item.

The terms "having", "comprising", "including", and variations thereof signify the presence of an embodiment.

The term "mechanically modified particle" is understood to mean here a particle of a material modified mechanically into a prerequisite particle size by applying a desired force and energy.

The term "gradation process" is understood to mean here a process of physical gradation of the selected raw construction material. Specifically in the present invention such "gradation process" is adapted to produce smallest fine aggregate fraction.

The term "lattice void filler" is understood to mean here a particle act as fillers which can fill a lattice voids in the mixture of construction material.

The term "strength" or "compressive strength" of concrete is the most common performance measure used by the engineer in designing buildings and other structures. The compressive strength is measured by breaking cylindrical concrete specimens in a compression-testing machine. The compressive strength is calculated from the failure load divided by the cross-sectional area resisting the load and reported in units of pound-force per square inch (psi) in US Customary units or megapascals (MPa) in SI units.

It should be noted that the term pozzolanic material as referenced herein below means material having capability of binding in the presence of water as understood in the art.

The mode average particle diameter as provided herein is understood to be the peak of the particle frequency distribution curve, obtained from PSD analysis. In simple words, the mode is the highest peak seen in the particle frequency distribution curve. The mode represents the particle size (or size range) most commonly found in the particle frequency distribution curve.

The smallest fine aggregate mode average particle diameter is termed herein as the mode average particle diameter of the smallest fine particles present in the raw construction material. The smallest fine aggregate mode average particle diameter thus provides a clear-cut idea of lattice void fillers being smallest particle of the raw construction material.

Further, the particle-size distribution (PSD) analysis is termed herein as the mathematical expression of finding about the ratio/proportion of various particle size ranges which are present in given raw construction material. Generally, volume, area, length, and quantity are used as standard dimensions for determining the particle amount present in the raw construction material. However, the volume of the raw construction material sample is considered as the easiest dimension and/or way of finding out the ratio of various particles size ranges present in the given raw construction sample.

The pozzolanic material is added as a part of concrete mixes as a replacement for the cement fraction. These materials do not have binding properties like cement, however, when they are ground to very fine levels pozzolans begin to react with the calcium hydroxide and water in the concrete. However, this reaction is a very slow process and can only be seen occurring at later stages of concrete setting. This means that a large proportion of the pozzolanic material remains in an inactive state during the early setting phases of cement, owing to its relatively higher sized particles and lesser potential of utilization of the available $Ca(OH)_2$ phase released by the primary hydration of hydraulic material. Therefore, the proportion of cement used in concrete mixes is also increased as the properties of the pozzolan materials remains unused.

The present invention provides a solution to this problem by adopting a mechano-chemical modification of concrete to best utilize the properties of the pozzolan component of concrete mixes. The composition and process disclosed in the present invention assist in enhancing the early strength properties of concrete binder mixes by using a lower quantity of cement thereby having the advantages of being cost-effective, environmentally friendly, and having superior properties compared with concrete without mechano-chemical modification.

The present invention presents a composition with a specific composition comprising a hydraulic material component, a pozzolan component and a pozzolan activator, such that the pozzolan component is obtained with a specific particle size through a gradation process.

In an embodiment of the present invention, there is provided an engineered concrete binder composition, comprising: a first set of cementitious material comprising hydraulic material optionally along with pozzolanic material; and a second set of cementitious material comprising pozzolanic material and pozzolan activator material, the second set of cementitious material having a mode average particle diameter (D2) not greater than ⅓ of the mode average particle diameter of the first set of cementitious material (D1).

Further, in another embodiment of the present invention, the engineered concrete binder composition comprises the first set of cementitious material having Blaine's fineness in a range of 3000 to 4000 $cm^2/gm$ and mode average particle size (MAPS) in a range of 70 to 80 microns.

In one implementation, the engineered concrete binder composition comprises the first set of cementitious material having Blaine's fineness in a range of at least one of 3000-3500 $cm^2/gm$, 3500-4000 $cm^2/gm$, 3000-3200 $cm^2/gm$, 3200-3400 $cm^2/gm$, 3200-3800 $cm^2/gm$, or 3800-4000 $cm^2/gm$. Further, the first set of cementitious material of the engineered concrete binder comprises a mode average particle size (MAPS) in a range of at least one of 70-80 microns, 75-80 microns, 70-75 microns, or 72-80 microns.

In a further implementation of the present invention, the engineered concrete binder composition comprises a second set of cementitious material having Blaine's fineness in a range of 10000 to 15000 $cm^2/gm$ and mode average particle size (MAPS) in a range of 20 to 30 microns. The second set of cementitious material may further comprise Blaine's fineness in a range of 10000-12000 $cm^2/gm$, 12000-15000 $cm^2/gm$, or 13000-15000 $cm^2/gm$ and a mode average particle size (MAPS) in a range of 20-25 micron, 25-20 micron, 22-28 microns, or 24-29 microns.

In an implementation of the present subject matter, the engineered concrete binder composition as described herein comprises the second set of cementitious material comprising 70 to 97 wt. % of the pozzolanic material and 3 to 30 wt. % of pozzolan activator material. In a further implementation, the second set of cementitious material may comprise at least one of 75 to 97 wt. % of the pozzolanic material and 3 to 25 wt. % of pozzolan activator; 80 to 97 wt. % pozzolanic material and 3 to 20 wt. % pozzolan activator material; 90 to 97 wt. % of the pozzolanic material and 3 to 10 wt. % pozzolan activator material.

The second set of cementitious material may have a mode average particle diameter (D2) in the range of ⅓ to ⅕ of the mode average particle diameter of the first set of cementitious material (D1). Further, in one implementation the mode average particle diameter of the pozzolan activator material is less than the mode average particle diameter of the pozzolanic material.

Additionally, the pozzolanic material may be present at an amount in a range of 24 to 80 wt. % of the engineered concrete binder composition. In another implementation, the engineered concrete binder composition comprises the pozzolanic material at an amount in the range of 24-70 wt. %, 24-50 wt. %, 24-30% wt. %, or 50-30% wt. % of the composition.

In an embodiment of the present invention, the pozzolanic material is selected from a group comprising of fly ash, blast furnace slag, volcanic ash material, a quartz material, pond ash, chemically modified fly ash, chemically modified blast furnace slag, chemically modified quartz, and combinations thereof. Further, the pozzolanic material is preferably fly ash.

In an embodiment of the present invention, the pozzolan activator material is selected from a group comprising of sodium sulphate, slag sand, lime and combination thereof. The pozzolan activator material is provided as a coat of on an external surface of the pozzolanic material in one implementation of the present subject matter.

Further, the concrete binder composition as disclosed herein also comprises the hydraulic material is present at an amount in a range of 20 to 60 wt. % of the composition. In another implementation, the concrete binder composition comprises the hydraulic material in an amount in the range of 20-30% wt. %, 20-40% wt. %, 20-50 wt. %, or 30-60 wt. % of the binder composition.

Additionally in one implementation of the present subject matter, the engineered concrete binder composition comprises hydraulic material selected from the group comprising Portland cement, modified Portland cement, or masonry cement, ground granulated blast-furnace slag, hydraulic hydrated lime, white cement, calcium aluminate cement, silicate cement, phosphate cement, high-alumina cement, magnesium oxychloride cement, oil well cements, and combinations thereof.

Further, the composition as described herein comprises at least one additive selected from a group comprising of micro silica, nano-silica, metakaoline, carbon nanotube (CNT) based additives, and combinations thereof.

Therefore, the engineered concrete binder composition where a pozzolanic material comprising a secondary set of cementitious materials, is obtained by mechano-chemical activation, where a binder is subject to grinding for a designated period in a ball mill, in combination with chemicals introduced in the process, during grinding. This is a kind of inter-grinding mechanism of pozzolan along with chemical. Adding pozzolan activators (such as sodium sulphate-$Na_2SO4$, or lime, or slag), activates the pozzolan material, such as fly ash, to trigger its pozzolanic reaction such as with calcium hydroxide, and the chemical was not intended to react by itself with the fly ash/pozzolan).

Also provided is a process for preparing an engineered concrete binder composition comprising mixing a first amount of a first set of cementitious material with a second amount of a second set of cementitious material to obtain the engineered concrete binder composition, wherein, the first set of cementitious material comprises hydraulic material optionally along with pozzolanic material; and the second set of cementitious material comprises comprising pozzolanic material and pozzolan activator material, the second set of cementitious material having a mode average particle diameter (D2) not greater than ⅓ of the mode average particle diameter of the first set of cementitious material (D1).

Further, the method includes the steps of obtaining the second set of cementitious material having the mode average particle diameter (D2). Accordingly, a mode average particle diameter of the second set of cementitious material is determined through a PSD curve analysis interpretation. The second set of cementitious material is then subjected to a mechanical modification process in a controlled manner until its mode average particle diameter (D2) is in the range of ⅓ to ⅕ of the mode average particle diameter (D1) of the first set of cementitious material.

In said mechanical modification processes, the particle size can be modified into a prerequisite particle size by applying a desired force and energy. More specifically modifying the particle size to a desired size level via any of the process involving application of machines such as but not limited to grinding, crushing, milling, steam jet milling with superheated steam, particle breakdown by electrical force, particle breakdown by magnetic force should be considered as the examples of application of machines for modifying the material particle size to the desired size level.

In an example implementation, the first set of cementitious material comprises Blaine's fineness in a range of 3000 to 4000 $cm^2/gm$ and mode average particle size (MAPS) in a range of 70 to 80 microns. Further, the first set of cementitious material comprises Blaine's fineness in a range of at least one of 3000-3500 $cm^2/gm$, 3500-4000 $cm^2/gm$, 3000-3200 $cm^2/gm$, 3200-3400 $cm^2/gm$, 3200-3800 $cm^2/gm$, or 3800-4000 $cm^2/gm$. Further, the first set of cementitious material of the engineered concrete binder comprises a mode average particle size (MAPS) in a range of at least one of 70-80 microns, 75-80 microns, 70-75 microns, or 72-80 microns.

In the method described herein, the second set of cementitious material comprises Blaine's fineness in a range of 10000 to 15000 $cm^2/gm$ and mode average particle size (MAPS) in a range of 20 to 30 microns. Additionally, in an embodiment of the present subject matter second set of cementitious material may further comprise Blaine's fineness in a range of 10000-12000 $cm^2/gm$, 12000-15000 $cm^2/gm$, or 13000-15000 $cm^2/gm$ and a mode average particle size (MAPS) in a range of 20-25 micron, 25-20 micron, 22-28 microns, or 24-29 microns.

In an implementation of the present subject matter, the engineered concrete binder composition as described herein comprises the second set of cementitious material comprising 70 to 97 wt. % of the pozzolanic material and 3 to 30 wt. % of pozzolan activator material. In a further implementation, the second set of cementitious material may comprise at least one of 75 to 97 wt. % of the pozzolanic material and 3 to 25 wt. % of pozzolan activator; 80 to 97 wt. % pozzolanic material and 3 to 20 wt. % pozzolan activator material; 90 to 97 wt. % of the pozzolanic material and 3 to 10 wt. % pozzolan activator material.

In an exemplary embodiment, the pozzolanic material is selected from a group comprising of fly ash, blast furnace slag, volcanic ash material, a quartz material, pond ash, chemically modified fly ash, chemically modified blast furnace slag, chemically modified quartz, and combinations thereof. Further, the pozzolanic material is preferably fly ash.

Further, the pozzolan activator material is selected from a group comprising of sodium sulphate, slag sand, lime and combination thereof. The pozzolan activator material is provided as a coat of on an external surface of the pozzolanic material in one implementation of the present subject matter.

In an implementation, the process for preparing an engineered concrete binder composition comprises the hydraulic material is present at an amount in a range of 20 to 60 wt. % of the composition. In another implementation, the concrete binder composition comprises the hydraulic material in an amount in the range of 20-30% wt. %, 20-40% wt. %, 20-50 wt. %, or 30-60 wt. % of the binder composition.

Further, in an embodiment of the present invention, the hydraulic material selected from the group comprising Portland cement, modified Portland cement, or masonry cement, ground granulated blast-furnace slag, hydraulic hydrated lime, white cement, calcium aluminate cement, silicate cement, phosphate cement, high-alumina cement, magnesium oxychloride cement, oil well cements, and combinations thereof.

The method as disclosed herein also comprises the step of adding at least one additive selected from a group comprising of micro silica, nano-silica, metakaoline, carbon nanotube (CNT) based additives, and combinations thereof to obtain the engineered concrete binder composition.

The present process for preparing the engineered binder concrete composition comprises a mechano-chemical modification method wherein the early strength properties of the concrete composition are significantly enhanced and subsequently the durability and longevity of the composition are significantly improved. To initiate the early strength properties of the present composition, the process disclosed herein further comprises the steps of mixing pozzolanic material and pozzolan activator material to obtain a mixture; and grinding the mixture thus obtained to obtain the second set of cementitious material having the mode average particle diameter (D2) not greater than ⅓ of the mode average particle diameter of the first set of cementitious material (D1).

The second cementitious material may also be obtained by mixing pozzolanic material with pozzolan activator material, both of the pozzolanic material and the pozzolan activator material having mode average particle diameter not greater than ⅓ of the mode average particle diameter of the first set of cementitious material (D1). Additionally, the second set of cementitious material may be obtained by providing a coat of pozzolan activator material on an external surface of the pozzolanic material.

Although the subject matter has been described in considerable detail with reference to certain preferred embodiments thereof, other embodiments are possible. The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may vary.

In an example implementation, the mechano-chemical modification of the engineered concrete binder composition is carried out using the hydraulic material PCE/PCP, lime, slag sand, and the pozzolan material fly ash and the pozzolan activator sodium sulphate. The materials are ground at 40 RPM for 2 hours. The particle size for each of the fractions is determined such that the hydraulic material comprising the PCE/PCP has Blaine's fineness in a range of 3000 to 4000 cm$^2$/gm and mode average particle size (MAPS) in a range of 70 to 80 microns. The fraction comprising the pozzolan material and activator has Blaine's fineness in a range of 10000 to 15000 cm$^2$/gm and mode average particle size (MAPS) in a range of 20 to 30 microns. The composition as then cast into cubes and then tested for strength and durability for a period of 1, 3, 7, 14, 28, and 56 days.

In an exemplary implementation, the proportion of hydraulic material, pozzolan material, and pozzolan activator are varied in each sample cube cast with the engineered concrete binder composition. For instance, one cube may contain 50% hydraulic material and 50% pozzolan material without pozzolan activator, while another cube may contain 50% hydraulic material and 50% pozzolan derivatives such that the pozzolan derivatives comprises 96% pozzolan material and 3% pozzolan activator. This is illustrated in Table 1 and Table 2 wherein the composition of the engineered concrete binder composition is varied, for instance, the control compositions primarily contain the pozzolan fly ash and OPC but do not contain pozzolan activator material sodium sulphate. Compositions CA1-CA4 may contain fly ash, sodium sulphate in varying proportions together with other components and also contain varying proportions of OPC as illustrated in Table 1. All compositions are then tested for penetration and consistency, and the strength tested periodically as shown in Table 2.

As seen in Table 2, the consistency of the mixtures does not vary in spite of adding the pozzolan activator materials, which is the key performance indicator that consistency does not play a role in the decrease/increase of strength in this case. Interestingly, there is a significant difference in the early strength properties of the test (CA) samples vs. the controls. The strength properties of test samples on day 1, and particularly day 3 and day 7, are much higher than control samples (Table 2, columns 6, 7, 8). For instance, comparing Control 1 with CA-1 50, both of which comprise 50% OPC and 50% CA, CA1-50 shows 25.16 Mpa compressive strength by Day 7, while Control 1 only shows 17.69 Mpa strength. This represents a 42.2% increase in early strength properties in CA1-50 vs. Control sample 1.

As demonstrated by the above examples, the present concrete binder composition and the process of preparing the above were obtained after extensive experimentation. The above binder composition possessing specific particle sizes of the various components and the specific chemical constituents of pozzolan and pozzolan activators were arrived not without undue experimentation and observations. This continuous series of different particle sizes having a defined mode average particle diameter is achieved via various mechanical particle size modification processes. This optimization of different particle sizes having a continuous series of different mode average particle diameter provides compact fillers of lattice void of the particle lattice structure ranging from Micro to Nano level. This mixture provides a perfect particle chemistry to fill the maximum voids of the particle lattice structure and also improves the chemistry related to the early settings and the latter settings of the concrete material.

Further, the chemical modification of the concrete composition enhances the properties contributed by the fine particle size, wherein the activator, such as sodium sulphate, initiates the reaction of the pozzolan material, such as fly ash, with Ca(OH)$_2$ phase released due to primary hydration process, to enhance the early strength of the concrete composition within 1 day of setting.

Therefore, in addition to the mechanical modification of the concrete composition as described herein, chemical modification using specific pozzolan activators ensures that the reactions between the pozzolan and Ca(OH)$_2$ phase occurs early and early setting of the concrete composition is

TABLE 1

| Mix | % Fly Ash | % Slag Sand | % Sodium Sulphate | % Lime | % PCE/PCP |
|---|---|---|---|---|---|
| Control 1 | 50 | | | | |
| Control 2 | 60 | | | | |
| Control 3 | 70 | | | | |
| CA1 | 96.17 | 0 | 3.66 | 0 | 0.5 |
| CA2 | 88 | | | 12 | |
| CA3 | 50 | | | 50 | |
| CA4 | 49 | 49 | 2 | | |

TABLE 2

| Mix No. | % CA | % OPC | Consistency | Penetration (mm) | Strength (Mpa) | | | | | |
|---|---|---|---|---|---|---|---|---|---|---|
| | | | | | Day 1 | Day 3 | Day 7 | Day 14 | Day 28 | Day 56 |
| Control 1 | 50 | 50 | 32 | 6.5 | 6.38 | 12.78 | 17.69 | 22.68 | 29.81 | 35.93 |
| Control 2 | 60 | 40 | 33.5 | 6.5 | 4.44 | 9.80 | 12.53 | 17.45 | 23.90 | 28.98 |
| Control 3 | 70 | 30 | 34 | 6 | 3 | 6.15 | 8.21 | 12.03 | 16.53 | 22.55 |
| CA1-50 | 50 | 50 | 30.5 | 6 | 9.44 | 17.19 | 25.16 | 34.02 | 38.97 | 42.77 |
| CA1-60 | 60 | 40 | 31 | 7 | 7.38 | 13.62 | 26.09 | 30.79 | 33.73 | 36.51 |
| CA1-70 | 70 | 30 | 30 | 6.5 | 5.40 | 12.60 | 19.91 | 25.24 | 27.88 | 28.60 |
| CA2-50 | 50 | 50 | 33 | 7 | 6.64 | 14.66 | 22.38 | 31.09 | 39.32 | 39.92 |
| CA2-60 | 60 | 40 | 34 | 7 | 5.02 | 10.95 | 15.49 | 21.57 | 28.9 | 36.43 |
| CA2-70 | 70 | 30 | 35.5 | 7 | 2.91 | 6.05 | 12.98 | 16.49 | 21.53 | 29.47 |
| CA3-50 | 50 | 50 | 32 | 6.5 | 7.36 | 17.62 | 24.50 | 34.30 | 37.36 | 44.5 |
| CA3-60 | 60 | 40 | 32.5 | 7 | 5.59 | 13.83 | 20.37 | 27.72 | 32.43 | 40.70 |
| CA3-70 | 70 | 30 | 33.5 | 6 | 3.77 | 10.73 | 17.29 | 22.74 | 30.12 | 34.16 |
| CA4-50 | 50 | 50 | 32 | 6.5 | 7.19 | 17.13 | 22.65 | 27.45 | 36.35 | 39.35 |
| CA4-60 | 60 | 40 | 32.5 | 6.5 | 5.82 | 14.78 | 21.60 | 27.76 | 32.57 | 34.23 |
| CA4-70 | 70 | 30 | 33 | 6 | 3.81 | 12.60 | 19.08 | 22.34 | 26.49 | 28.62 | initiated. This is not possible only with mechanical modification, as demonstrated by the control samples, which do not display early setting properties.

While the invention has been described with respect to specific method which includes presently preferred modes of carrying out the invention, those skilled in the art will appreciate that there are numerous variations and permutations of the above-described embodiment that fall within the spirit and scope of the invention. It should be understood that the invention is not limited in its application to the details of construction and arrangements of the components set forth herein. Variations and modifications of the foregoing are within the scope of the present invention. Accordingly, many variations of these embodiments are envisaged within the scope of the present invention.

The foregoing descriptions of the specific embodiment of the present invention have been presented for purposes of description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiment with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

We claim:

1. An engineered concrete binder composition, comprising:
   a first set of cementitious material comprising hydraulic material optionally along with pozzolanic material; and
   a second set of cementitious material comprising pozzolanic material and pozzolan activator material, the second set of cementitious material having a mode average particle diameter (D2) not greater than ⅓ of the mode average particle diameter of the first set of cementitious material (D1).

2. The engineered concrete binder composition as claimed in claim 1, wherein the first set of cementitious material have Blaine's fineness in a range of 3000 to 4000 cm2/gm and mode average particle size (MAPS) in a range of 70 to 80 microns.

3. The engineered concrete binder composition as claimed in claim 1, wherein the second set of cementitious material have Blaine's fineness in a range of 10000 to 15000 cm/gm and mode average particle size (MAPS) in a range of 20 to 30 microns.

4. The engineered concrete binder composition as claimed in claim 1, wherein the second set of cementitious material comprises 70 to 97 wt. % of the pozzolanic material and 3 to 30 wt. % of pozzolan activator material.

5. The engineered concrete binder composition as claimed in claim 1, wherein the pozzolan activator material is selected from a group consisting of sodium sulphate, slag sand, lime and combination thereof.

6. The engineered concrete binder composition as claimed in claim 1, wherein the hydraulic material is present at an amount in a range of 20 to 60 wt. % of the engineered concrete binder composition.

7. The engineered concrete binder composition as claimed in claim 1, wherein the pozzolanic material is present at an amount in a range of 24 to 80 wt. % of the engineered concrete binder composition.

8. The engineered concrete binder composition as claimed in claim 1, wherein the pozzolanic material is selected from a group consisting of fly ash, blast furnace slag, volcanic ash material, a quartz material, pond ash, chemically modified fly ash, chemically modified blast furnace slag, chemically modified quartz, micro-silica, metakaolin and combinations thereof.

9. The engineered concrete binder composition as claimed in claim 1, wherein the hydraulic material is selected from a group consisting of Portland cement, modified Portland cement, masonry cement, ground granulated blast-furnace slag, hydraulic hydrated lime, white cement, calcium aluminate cement, silicate cement, phosphate cement, high-alumina cement, magnesium oxychloride cement, oil well cements, and combinations thereof.

10. The engineered concrete binder composition as claimed in claim 1, further comprising at least one additive selected from a group consisting of nano-silica, carbon nanotube (CNT) based additives, and combination thereof.

11. The engineered concrete binder composition as claimed in claim 1, wherein the second set of cementitious material have a mode average particle diameter (D2) in the range of ⅓ to ⅕ of the mode average particle diameter of the first set of cementitious material (D1).

12. The engineered concrete binder composition as claimed in claim 1, wherein the pozzolan activator material is provided as a coat of on an external surface of the pozzolanic material.

13. The engineered concrete binder composition as claimed in claim 12, wherein a mode average particle diameter of the pozzolan activator material is less than the mode average particle diameter of the pozzolanic material.

14. A process for preparing an engineered concrete binder composition, said process comprising:
   mixing a first amount of a first set of cementitious material with a second amount of a second set of cementitious material to obtain the engineered concrete binder composition, wherein:
   the first set of cementitious material comprises hydraulic material optionally along with pozzolanic material; and
   the second set of cementitious material comprises comprising a pozzolanic material and pozzolan activator material, the second set of cementitious material having a mode average particle diameter (D2) not greater than ⅓ of the mode average particle diameter of the first set of cementitious material (D1).

15. The method as claimed in claim 14, wherein the first set of cementitious material have Blaine's fineness in a range of 3000 to 4000 cm$^2$/gm and mode average particle size (MAPS) in a range of 70 to 80 microns.

16. The method as claimed in claim 14, wherein the second set of cementitious material have Blaine's fineness in a range of 10000 to 15000 cm$^2$/gm and mode average particle size (MAPS) in a range of 20 to 30 microns.

17. The method as claimed in claim 14, wherein the second set of cementitious material comprises 40 to 97 wt. % of the pozzolanic material and 3 to 60 wt. % of pozzolan activator material.

18. The method as claimed in claim 14, wherein the pozzolan activator material is selected from a group consisting of sodium sulphate, slag sand, lime and combination thereof.

19. The method as claimed in claim 14, wherein the hydraulic material is present at an amount in a range of 20 to 60 wt. % of the engineered concrete binder composition.

20. The method as claimed in claim 14, wherein the pozzolanic material is present at an amount in a range of 24 to 80 wt. % of the engineered concrete binder composition.

* * * * *